3,293,050
METHOD AND COMPOSITION FOR PROVIDING CORROSION RESISTANCE TO METAL SURFACES
Frank I. L. Lawrence, Bradford, Pa., assignor to Kendall Refining Company, Bradford, Pa., a corporation of Pennsylvania
No Drawing. Filed Jan. 28, 1963, Ser. No. 254,470
17 Claims. (Cl. 106—14)

This invention relates to methods and compositions for providing corrosion resistance to metal surfaces and particularly to a method and a composition for underbody coatings for automotive vehicles, designed to protect the metal parts against underbody rusting and corrosion.

Operators of motor vehicles in the northern states, where salt is used to fight winter snow, are faced with the problem of the corrosive effect of the salt-snow mixture upon the underbody of their vehicle. Similarly, motorists in the coastal areas are aware of the similar effect of salt air as a corrosive agent on unprotected portions of their automobile's underbody. In an effort to overcome this corrosion problem, it has for many years, been the practice to apply an undercoating to the unprotected underbody of the vehicle. Conventional undercoating is primarily an asphaltic type of coating which sets up on the surfaces which have been coated to form a hardened coating. This type of undercoating has several serious disadvantages. It becomes hard and brittle with age and breaks away with the vibration of the vehicle or, what is even more serious, cracks and forms a pocket in which the corrosive salt spray can collect and continue to react with the metal in a localized area over an extended period of time.

I have invented a material for undercoating the bodies of automotive vehicles and the like which will not harden on age but remains permanently soft and pliable. The material of my invention has the capacity to revitalize conventional asphaltic type undercoatings by softening and fitting the aged and cracked coating. The material of the present invention is easily applied and does not require the complex spraying equipment necessary with conventional undercoating materials. The material of the present invention is, moreover, generally much less dangerous to apply than conventional undercoatings of the asphaltic base type which are generally thinned with a low flash point solvent such as Stoddard solvent or some thinner even more volatile than Stoddard solvent.

I have found that a composition based upon a water-resistant grease formulated with a special base oil containing volatile components which evaporate, will provide a coating whose character is far superior to anything heretofore proposed for corrosion resistance.

A coating composition according to my invention might have the following broad general composition:

12 to 18% of a soap from the group consisting of metal soaps and bentonite soaps
12 to 18% of a base oil "A" more fully described hereafter
1½ to 2½% rust inhibitor
60 to 66% of a base oil "B" described hereafter A pigment may be added if desired, for example, graphite or carbon black in an amount sufficient to impart the desired color. For example, we have used as little as 0.1% carbon black and as much as 7% graphite.

Base oil "A" in the above composition may be any oil capable of dissolving the metal soap and having a viscosity of about 100/100. For example a 100 second low pour paraffine base oil may be used. However, I prefer to use as base oil "A" the following hydrocarbon composition:

About 47% to 51% heavy resin extract
About 49% to 53% mineral seal oil

This composition will have a viscosity at 100° F. of 410 to 430 SUS.

In the case of base oil "B" I preferably use the following composition:

5 to 6½% petrolatum
12 to 14% air condensed hydrocarbon resin having a ring and ball softening point of about 250° F.
59 to 64% odorless kerosene
19 to 21% heavy resin extract
0.2 to 0.4% zinc diamyl dithiocarbamate The odorless kerosene used in the foregoing composition is a highly acid treated hydrocarbon fraction which has the following properties:

| | | |
|---|---|---|
| Gravity | ° API | 50.4 |
| Flash point | ° F | 180 |
| Distillation range | ° F | 385–465 |

The kerosene fraction may be obtained from any suitable conventional source or a similar hydrocarbon having similar molecular weight-volatility relationships such as those obtained from alkylation and hydrogenation refining processes are suitable. Likewise I may use a straight run or acid treated kerosene. For example, I may use a straight run kerosene having the following characteristics:

46½–48 API  Flash COC—150–160° F.
10% max—400° F.  P.M. flash—110 Min. ° F.
E.P. max.—525° F.

A single preferred composition according to my invention would have the following composition and properties:

*Composition*

15.0% calcium soap
15.0% base oil "A":
    49% heavy resin extract
    51% mineral seal oil
    Viscosity at 100° F., 420 SUS
5.0% graphite
2.0% rust inhibitor
63.0% base oil "B":
    5.7% petrolatum
    12.9% air condensed hydrocarbon
    Resin (250° F. R and B softening point)
    61.3% odorless kerosene
    19.8% heavy resin extract
    0.3% zinc diamyl dithiocarbamate
    Viscosity at 100° F., 86 SUS

*Properties*

Penetration (ASTM D 217)—295–305
Dropping point (ASTM D 566)—190° F.
Flash point (ASTM D 92)—185° F.

I prefer this composition because it provides good adhesion, a good temperature viscosity relationship, retains its flexibility down to −20° F. and provides abrasion resistance against sand, gravel, road dirt and the like.

The metal soaps which I prefer to use are the calcium, lithium, aluminum, barium, bentonite and barium and calcium complex greases, all of which are highly water resistant and serve as a base for the material of the present invention.

If graphite is used as a pigment it will increase abrasion resistance and lubricate certain elements of the underbody, such as brake cables and the like, which are continually or relatively often in motion. This function can be advantageously although not of critical importance because certain portions of the underbody of the vehicle, such as the fender wells, are subject to considerable abrasion by the splashing of road grime and water.

The petrolatum improves the viscosity temperature relationship of the mixture and its waxy character permits some flow or creep of the admixture which tends to cause the coating to creep into crevices and otherwise inaccessible areas which are not reached by conventional undercoatings and which serve as the nucleus for cracking and breaking of conventional coatings. Preferably the petrolatum is derived from a Pennsylvania crude oil by propane dewaxing of a cylinder stock at a temperature of −30° F. and preferably is characterized by the following physical properties:

| | |
|---|---|
| Melting point (ASTM D 127), ° F. | 126.5 |
| Penetration | 50 |
| Viscosity at 210° F., SUS | 126 |
| Gravity, ° API | 30.0 |

The heavy resin extract, which forms a part of the composition of base oils "A" and "B," is a 35% by weight phenol extract derived from a heavy hydrocarbon resin originally obtained by propane fractionation of a Pennsylvania cylinder stock at a temperature of 140° F. and propane-oil ratio of 1:20. The physical properties of this heavy resin are as follows:

| | |
|---|---|
| Gravity ° API | 7.3 |
| Softening point (ring and ball) ° F. | 125 |

The air condensed hydrocarbon resins mentioned in the composition of base oil "B" are described by McCluer et al. in U.S. Patent 2,337,336.

The mineral seal oil, which forms a portion of composition "A," is a lightly acid treated hydrocarbon fraction having the following physical properties:

| | |
|---|---|
| Gravity ° API | 39.2 |
| Flash point ° F. | 290 |
| Viscosity at 100° F. SUS | 40 |
| Saybolt color | +20 |
| Boiling range ° F. | 515–625 |

Broadly stated the composition comprises:
(a) About 10% to 20% of a soap selected from the group consisting of metal soaps and bentonite soaps;
(b) About 12–18% of an oleaginous solvent for said soap;
(c) About 1.5% to 2.5% rust inhibitor; and
(d) About 58% to 68% of a composition consisting essentially of about 36 to 43.5% of a material from the group consisting of oleaginous condensed hydrocarbon and asphaltic materials with a ring and ball softening point of about 200° F.; about 59 to 64% kerosene and about 0.2 to 0.4% zinc diamyl dithiocarbamate.

The composition of this invention can perhaps best be understood by reference to a complete example of the preparation of a preferred formulation.

Approximately 1400 grams of distilled animal fatty acids having an acid number of about 198, a color of 2 NPA, a 52° titre, and a saponification value of 200, are mixed with 1500 grams of the base oil "A" of the preferred composition above described and 197 grams of hydrated lime in a steam jacketed kettle provided with good agitation. The temperature in the jacketed kettle is held at about 250° F. to insure good soap formation and yet minimize the hazard from the flash point of the mineral seal oil fraction of base oil "A." The mixture is agitated and heated for approximately 2½ hours.

Upon the completion of the soap formation, 4800 grams of base oil "B" is added to the mixture in the steam jacketed kettle. Heat is applied to the mixture sufficient to maintain the temperature at least about 180° to 190° F. Water in the amount of 150 grams is slowly added over the period of about half an hour in order to stabilize the grease structure. Mixing is continued for about half an hour with the steam turned off the jacket, after which 1500 additional grams of base oil "B," 500 grams of fine particle size graphite, and about 200 grams of a suitable rust inhibitor are added. The rust inhibitor may be a material from any of the group consisting of metallic sulfonates and naphthenates such as barium petroleum sulfonates, calcium naphthenates and zinc salts of naphthenic acids; amines and amine salts such as hexylamine, dodecylamine, alkyl oxazolines and oxazoline salts of high molecular weight acids such as stearic acid and oleic acid; and other compounds such as sorbitol monooleate and sulfated castor oil.

Preferably I apply the material of this invention by the use of a single hose or so-called "airless" gun, such as the Alemite Model 8595 or 8596. The composition is sprayed onto all of the surfaces to be coated. Since the material of this invention has the capacity to penetrate a normal amount of road dirt, it is not necessary to clean the surfaces down to bare metal. It is desirable, however, to remove large pieces of underbody dirt or mud.

In the foregoing specification I have set out certain preferred compositions and practices of my invention. It will be understood, however, that this invention may be otherwise practiced within the scope of the following claims.

I claim:
1. A corrosion resistant coating for metal surfaces consisting essentially of,
   (a) about 12% to 18% of a soap selected from the group consisting of metal soaps and bentonite soaps of fatty acids,
   (b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
   (c) about 1½% to 2½% of rust inhibitor selected from the group consisting of metallic sulfonates, metallic naphthenates, alkyl amines and alkyl amine salts, alkyl oxazolines, oxazoline salts of high molecular weight acids, sorbitol monooleates, and sulfonated castor oil; and
   (d) about 60% to 66% of a composition consisting essentially of about 5% to 6½% petrolatum, about 12% to 14% air condensed hydrocarbon resin having a ring and ball softening point of about 250° F., about 59% to 64% of a member from the group consisting of odorless kerosene and kerosene, about 19% to 21% phenol extract of a heavy hydrocarbon resin and about 0.2% to 0.4% zinc diamyl dithiocarbamate.

2. A corrosion resistant coating for metal surfaces consisting essentially of,
   (a) about 15% calcium soap of a fatty acid,
   (b) about 15% of a composition consisting essentially of about 49% phenol extract of a heavy hydrocarbon resin and 51% mineral seal oil,
   (c) about 5% graphite,
   (d) about 2% of calcium naphthenate; and
   (e) about 63% of a composition consisting essentially of about 5.7% petrolatum, about 12.9% air condensed hydrocarbon resin having a ring and ball softening point of about 250° F., and about 60% kerosene.

3. A corrosion resistant coating for metal surfaces consisting essentially of,
   (a) about 12% to 18% of a soap selected from the group consisting of metal soaps and bentonite soaps of fatty acids,
   (b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 3% to 7% graphite,
(d) about 1½% to 2½% of rust inhibitor selected from the group consisting of metallic sulfonates, metallic naphthenates, alkyl amines and alkyl amine salts, alkyl oxazolines, oxazoline salts of high molecular weight acids, sorbital monooleates, and sulfonated castor oil; and
(e) about 60% to 66% of a composition consisting essentially of about 5% to 6½% petrolatum, about 12% to 14% air condensed hydrocarbon resin having a ring and ball softening point of about 250° F., about 59% to 64% of a hydrocarbon having a molecular weight-volatility relationship similar to that of kerosene, about 19% to 21% phenol extract of a heavy hydrocarbon resin and about 0.2% to 0.4% zinc diamyl dithiocarbamate.

4. A corrosion resistant coating for metal surfaces consisting essentially of,
(a) about 12% to 18% of a soap selected from the group consisting of metal soaps and bentonite soaps of fatty acids,
(b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 3% to 7% graphite; and
(d) about 60% to 66% of a composition consisting essentially of about 5% to 6½% petrolatum, about 12% to 14% air condensed hydrocarbon resin having a ring and ball softening point of about 250° F., about 59% to 64% odorless kerosene, about 19% to 21% phenol extract of a heavy hydrocarbon resin and about 0.2% to 0.4% zinc diamyl dithiocarbamate.

5. A corrosion resistant coating for metal surface consisting essentially of,
(a) about 12% to 18% of a soap selected from the group consisting of metal soaps and bentonite soaps of fatty acids,
(b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 3% to 7% graphite; and
(d) about 60% to 66% of a composition consisting essentially of about 5% to 6½% petrolatum, about 12% to 14% air condensed hydrocarbon resin having a ring and ball softening point of about 250° F., about 59% to 64% odorless kerosene, about 19% to 21% phenol extract of a heavy hydrocarbon resin and about 0.2% to 0.4% zinc diamyl dithiocarbamate.

6. A corrosion resistant coating for metal surfaces consisting essentially of,
(a) about 15% barium soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F. and about 60% kerosene.

7. A corrosion resistant coating for metal surfaces consisting essentially of,
(a) about 15% bentonite soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F. and about 60% kerosene.

8. A corrosion resistant coating for metal surfaces consisting essentially of,
(a) about 15% aluminum soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F. and about 60% kerosene.

9. The method of imparting corrosion resistance to an automotive vehicle underbody comprising the step of spraying onto the surface to be protected an admixture consisting essentially of,
(a) about 12% to 18% of a soap selected from the group consisting of metal soaps and bentonite soaps of fatty acids,
(b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 3% to 7% graphite; and
(d) about 60% to 66% of a composition consisting essentially of about 5% to 6½% petrolatum, about 12% to 14% air condensed hydrocarbon resin having a ring and ball softening point of about 250° F., about 59% to 64% odorless kerosene, about 19% to 21% phenol extract of a heavy hydrocarbon resin and about 0.2% to 0.4% zinc diamyl dithiocarbamate.

10. The method of imparting corrosion resistance to an automotive vehicle underbody comprising the step of spraying onto the surface to be protected an admixture consisting essentially of,
(a) about 12% to 18% of a soap selected from the group consisting of metal soaps and bentonite soaps of fatty acids,
(b) about 12% to 18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 3% to 7% graphite,
(d) about 1½% to 2½% of rust inhibitor selected from the group consisting of metallic sulfonates, metalic naphthenates, alkyl amines and alkyl amine salts, alkyl oxazolines, oxazoline salts of high molecular weight acids, sorbitol monooleates, and sulfonated castor oil; and
(e) about 60% to 66% of a composition consisting essentially of about 5% to 6½% petrolatum, about 12% to 14% air condensed hydrocarbon resin having a ring and ball softening point of about 250° F., about 59% to 64% odorless kerosene, about 19% to 21% phenol extract of a heavy hydrocarbon resin and about 0.2% to 0.4% zinc diamyl dithiocarbamate.

11. The method of imparting corrosion resistance to an automotive vehicle underbody comprising the step of spraying onto the surface to be protected an admixture consisting essentially of:
(a) about 10 to 20% of a soap selected from the group consisting of metal soaps and bentonite soaps of fatty acids, (b) about 12–18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 1.5 to 2.5% rust inhibitor selected from the group consisting of metallic sulfonates, metallic naphthenates, alkyl amines and alkyl amine salts, alkyl oxazolines, oxazoline salts of high molecular weight acids, sorbitol monooleates, and sulfonated castor oil, and
(d) about 58 to 68% of a composition consisting essentially of about 36 to 43.5% of a member from the group consisting of an oleaginous condensed hydrocarbon resin and equivalent asphaltic material with a ring and ball softening point of about 200° F.; about 59 to 64% kerosene and about 0.2 to 0.4% zinc diamyl dithiocarbamate.

12. A corrosion resistant coating for metal surfaces consisting essentially of:
(a) about 10 to 20% of a soap selected from the group consisting of metal soaps and bentonite soaps of fatty acids,
(b) about 12–18% of an oleaginous solvent for said soap selected from the group consisting of 100 second low pour oils and the composition consisting essentially of 47% to 51% phenol extract of a heavy hydrocarbon resin and 49% to 53% mineral seal oil,
(c) about 1.5 to 2.5% rust inhibitor selected from the group consisting of metallic sulfonates, metallic naphthenates, alkyl amines and alkyl amine salts, alkyl oxazolines, oxazoline salts of high molecular weight acids, sorbitol monooleates, and sulfonated castor oil, and
(d) about 58 to 68% of a composition consisting essentially of about 36 to 43.5% of a member from the group consisting of an oleaginous condensed hydrocarbon resin and equivalent asphaltic material with a ring and ball softening point of about 200° F.; about 59 to 64% kerosene and about 0.2 to 0.4% zinc diamyl dithiocarbamate.

13. A corrosion resistant coating for metal surfaces consisting essentially of,
(a) about 12% to 18% of a soap selected from the group consisting of metal soaps and bentonite soaps of fatty acids,
(b) about 12% to 18% of an oleaginous solvent for said soap of a composition consisting essentially of 47% to 51% phenol extract of a heavy hydrocarbon resin and 49% to 53% mineral seal oil,
(c) about 3% to 7% graphite,
(d) about 1½% to 2½% of rust inhibitor selected from the group consisting of metallic sulfonates, metallic naphthenates, alkyl amines and alkyl amine salts, alkyl oxazolines, oxazoline salts of high molecular weight acids, sorbitol monooleates, and sulfonated castor oil; and
(e) about 60% to 66% of a composition consisting essentially of about 5% to 6½% petrolatum, about 12% to 14% air condensed hydrocarbon resin having a ring and ball softening point of about 250° F., about 59% to 64% odorless kerosene, about 19% to 21% phenol extract of a heavy hydrocarbon resin and about 0.2% to 0.4% zinc diamyl dithiocarbamate.

14. A corrosion resistant coating for metal surfaces consisting essentially of,
(a) about 15% calcium soap of a fatty acid,
(b) about 15% of 100 second low pour oil,
(c) about 5% graphite,
(d) about 2% of calcium naphthenate; and
(e) about 63% of a composition consisting essentially of about 5.0% petrolatum, about 11.4% air condensed hydrocarbon resin having a ring and ball softening point of about 250° F., about 54.25% odorless kerosene, about 29.3% phenol extract of a heavy hydrocarbon resin and about 0.05% zinc diamyl dithiocarbamate.

15. A corrosion resistant coating for metal surfaces consisting essentially of:
(a) about 15% barium soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F., about 61.3% odorless kerosene, about 19.8% phenol extract of a heavy hydrocarbon resin, and about 0.3% zinc diamyl dithiocarbamate.

16. A corrosion resistant coating for metal surfaces consisting essentially of:
(a) about 15% bentonite soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F., about 61.3% odorless kerosene, about 19.8% phenol extract of a heavy hydrocarbon resin, and about 0.3% zinc diamyl dithiocarbamate.

17. A corrosion resistant coating for metal surfaces consisting essentially of,
(a) about 15% aluminum soap of a fatty acid,
(b) about 15% of a composition consisting essentially of about 49% phenol extract of a heavy hydrocarbon resin and 51% mineral seal oil,
(c) about 5% graphite,
(d) about 2% of calcium naphthenate; and
(e) about 63% of a composition consisting essentially of about 5.7% petrolatum, about 12.9% air condensed hydrocarbon resin having a ring and ball softening point of about 250° F., about 61.3% odorless kerosene, about 19.8% phenol extract of a heavy hydrocarbon resin, and about 0.3% zinc diamyl dithiocarbamate.

References Cited by the Examiner
UNITED STATES PATENTS

| | | | |
|---|---|---|---|
| 2,532,616 | 12/1950 | Hardy | 106—14 |
| 2,615,815 | 10/1952 | Galvin et al. | 106—14 |
| 2,641,551 | 6/1953 | Smith et al. | 106—14 |
| 2,685,523 | 8/1953 | Cross et al. | 106—14 |

MORRIS LIEBMAN, *Primary Examiner.*

ALFRED L. LEAVITT, ALEXANDER H. BRODMERKEL, *Examiners.*

L. HAYES, *Assistant Examiner.*